United States Patent
Ruia

(10) Patent No.: US 11,976,847 B2
(45) Date of Patent: May 7, 2024

(54) AIR PURIFICATION SYSTEM

(71) Applicant: Danvita Thermal LLC, Austin, TX (US)

(72) Inventor: Nihar Ruia, Austin, TX (US)

(73) Assignee: Danvita Thermal LLC, Austin, TX (US)

( * ) Notice: Subject to any disclaimer, the term of this patent is extended or adjusted under 35 U.S.C. 154(b) by 0 days.

(21) Appl. No.: 18/187,550

(22) Filed: Mar. 21, 2023

(65) Prior Publication Data
US 2023/0304683 A1 Sep. 28, 2023

Related U.S. Application Data

(60) Provisional application No. 63/322,568, filed on Mar. 22, 2022.

(51) Int. Cl.
*F24F 8/10* (2021.01)
*B01D 46/00* (2022.01)
(Continued)

(52) U.S. Cl.
CPC .......... *F24F 8/108* (2021.01); *B01D 46/0028* (2013.01); *B01D 46/62* (2022.01); *F24F 8/158* (2021.01); *F24F 8/20* (2021.01); *F24F 8/80* (2021.01); *F24F 11/52* (2018.01); *F24F 13/20* (2013.01); *F24F 13/28* (2013.01);
(Continued)

(58) Field of Classification Search
CPC ..... B01D 46/0028; B01D 46/56; B01D 46/62
See application file for complete search history.

(56) References Cited

U.S. PATENT DOCUMENTS

| 5,313,803 A | 5/1994 | Detzer |
| 8,087,492 B2 | 1/2012 | Cursetjee et al. |

(Continued)

FOREIGN PATENT DOCUMENTS

| CN | 205570095 U | * | 9/2016 |
| CN | 206094342 U | * | 4/2017 |

(Continued)

OTHER PUBLICATIONS

Austin Air Systems, Healthmate Plus-Sandstone, Date first available: Nov. 2, 2001, Available from Internet <URL: https://www.amazon.com/Austin-Air-B450A1-HealthMate-Sandstone/dp/B00GFZIFPQ?linkCode=sl1&tag=roap0d-20&linkId=b7a904a2a5ad418fa620215e1189ee17&language=en_US&ref_=as_li_ss_tl&th=1>.
(Continued)

*Primary Examiner* — Robert A Hopkins
(74) *Attorney, Agent, or Firm* — Gallium Law; Wesley Schwie; Justin Schwechter

(57) ABSTRACT

The present disclosure describes an apparatus including an air purifier having a housing. In some examples, the air purifier includes an intake and an outlet. According to some examples, the intake and the outlet are connected by an air passage. The air purifier may include a filtration system comprising a plurality of filters. In some examples, the filtration system is configured such that an airflow enters the air passage through the intake, passes through each one of the plurality of filters subsequent to entering the intake, and exits the air passage through the outlet subsequent to passing through the plurality of filters. According to some examples, the plurality of filters comprises a chemical adsorption filter.

20 Claims, 10 Drawing Sheets

(51) Int. Cl.

| | | |
|---|---|---|
| *B01D 46/62* | (2022.01) | |
| *F24F 8/108* | (2021.01) | |
| *F24F 8/158* | (2021.01) | |
| *F24F 8/20* | (2021.01) | |
| *F24F 8/80* | (2021.01) | |
| *F24F 11/52* | (2018.01) | |
| *F24F 13/20* | (2006.01) | |
| *F24F 13/28* | (2006.01) | |
| *F24F 110/50* | (2018.01) | |

(52) U.S. Cl.
CPC .... *B01D 2273/30* (2013.01); *F24F 2013/207* (2013.01); *F24F 2110/50* (2018.01)

(56) References Cited

U.S. PATENT DOCUMENTS

| | | | |
|---|---|---|---|
| 8,276,544 B2 | 10/2012 | Seltzer et al. | |
| 9,440,219 B2 | 9/2016 | Böhringer et al. | |
| 9,757,674 B2 | 9/2017 | Kwon et al. | |
| 10,058,807 B2 | 8/2018 | Dallas et al. | |
| 10,364,994 B2 | 7/2019 | Kelly et al. | |
| 10,537,655 B2 | 1/2020 | Wesén et al. | |
| 10,859,279 B2 | 12/2020 | Kim et al. | |
| 11,202,845 B2 | 12/2021 | Uchimura | |
| 11,376,451 B2 | 7/2022 | Schuller | |
| 11,480,351 B2 | 10/2022 | Oh et al. | |
| 11,585,548 B2 | 2/2023 | Yang et al. | |
| 2006/0196157 A1* | 9/2006 | Greer | A62B 23/02 |
| | | | 55/500 |
| 2009/0188218 A1 | 7/2009 | Pippel et al. | |
| 2014/0238243 A1 | 8/2014 | Jardine et al. | |
| 2020/0182495 A1 | 6/2020 | Park et al. | |
| 2020/0206675 A1 | 7/2020 | Kim et al. | |
| 2020/0348033 A1 | 11/2020 | Krüger | |

FOREIGN PATENT DOCUMENTS

| | | | |
|---|---|---|---|
| CN | 207527734 U * | 6/2018 | |
| CN | 108709252 A | 10/2018 | |
| CN | 109282354 A | 1/2019 | |
| CN | 109442610 A | 3/2019 | |
| CN | 110068082 A | 7/2019 | |
| CN | 110207288 A | 9/2019 | |
| CN | 111550884 A | 8/2020 | |
| CN | 109114697 B | 6/2021 | |
| CN | 110410886 A | 6/2021 | |
| JP | H0647246 A | 2/1994 | |
| JP | H0795 B2 | 1/1995 | |
| JP | 2001522448 A * | 11/2001 | ............... F24F 8/20 |
| JP | 2003166732 A | 6/2003 | |
| JP | 2003334440 A | 11/2003 | |
| JP | 2004105879 A * | 4/2004 | |
| KR | 20210135057 A | 11/2021 | |
| KR | 20210138353 A | 11/2021 | |
| WO | 1997037756 A1 | 10/1997 | |
| WO | 2014154012 A1 | 10/2014 | |
| WO | 2017055466 A1 | 4/2017 | |
| WO | 2019063834 A2 | 8/2019 | |
| WO | 2019167585 A1 | 9/2019 | |
| WO | 2020196772 A1 | 10/2020 | |

OTHER PUBLICATIONS

Air Science, Air Science Multiplex™ Filtration System, Downloaded on: Feb. 24, 2022, Available from Internet <URL: https://www.airscience.com/multiplex-filtration?keyword=&creative=&gclid=CjwKCAjw_ihBhADEiwAXEazJo1iaXxggUgUgoYixwi832-0egsdeYzMeQpGbYAXN68G3IGydJ1IWwhoCfJUQAvD_BwE>.

Oransi, Oransi mod | HEPA Air Purifier for Large Rooms, 3-Stage HEPA & Carbon Air Filter—1,250 Sq Ft coverage, Available at least as early as: Nov. 17, 2020, Available from Internet <URL: https://www.amazon.com/dp/B08KPN4W9K/ref=emc_b_5_t?th=1>.

IQAir, IQAir GC MultiGas—Medical-Grade Air Purifier for Chemicals, Gases, & Odors with MultiGas & H11 HyperHEPA Pre-Filter—Odors, Smoke, Allergens, Pets, Asthma Triggers, Pollen, Dust, MCS; Swiss Made, White, Date first available: Nov. 2, 2001, Available from Internet <URL: https://www.amazon.com/IQ/Air-MultiGas-Purifier-Medical-Grade-HyperHEPA/dp/B00069EGA0?th=1>.

Amazon, Molekule Air Pro FDA-Cleared Medical Air Purifier with PECO Technology for Smoke, Allergens, Pollutants, Viruses, Bacteria and Mold in Professional Spaces, Available at least as early as: Apr. 7, 2021, Available from Internet <URL: https://www.amazon.com/dp/B08J9J396N/ref=emc_b_5_t?th=1.

EnviroKlenz, EnviroKlenz Mobile Air System, Downloaded on: Feb. 24, 2022, Available from Internet <URL: https://enviroklenz.com/product/enviroklenz-mobile/?sscid=21k6_In0xu>.

Amazon, Winix 5500-2 Air Purifier with True HEPA, PlasmaWave and Odor Reducing Washable AOC Carbon Filter Medium , Charcoal Gray, Date first available: Mar. 21, 2016, Available from Internet <URL: https://www.amazon.com/Winix-5500-2-Purifier-PlasmaWave-Reducing/dp/B01D8DAYII/ref=as_il_ss_tl?ie=UTF8&linkCode=sl1&tag=roap0d-20&linkId=7a5ba7cc9e60d6011239c65ccab35bb3&language=en_US&th=1.

* cited by examiner

AIR PURIFICATION SYSTEM

BACKGROUND

There are many types of indoor air pollutants, such as volatile organic compounds (like toluene, formaldehyde, and acetone), lead dust, fertilizers and animal waste, dust mites, insects, biological contaminants, alcohol, chlorine, ammonia, and petrol-based solvents, oxides of nitrogen and sulfur, ozone, carbon monoxide, smoke, bacteria and odor (such as that from leftover food), aerosols and viruses (such as those contained in exhaled air) and allergen components. These indoor air pollutants mainly cause discomfort, but some of them may prove to be more harmful, causing respiratory disorders, viral infections, or allergies. The use of air filtration or air purification systems with one or more filters may be useful to mitigate the negative effects of these particulates or pollutants.

SUMMARY

The present disclosure describes an apparatus (e.g., see apparatus 100 as shown in FIG. 1) including an air purifier having a housing (e.g., see housing 102 as shown in FIG. 1). In some examples, the air purifier includes an intake (e.g., see intake 204 as shown in FIG. 2) and an outlet (e.g., see the outlet 206 as shown in FIG. 2). According to some examples, the intake and the outlet are connected by an air passage (e.g., see the air passage 214 as shown in FIG. 2). The air purifier may include a filtration system (e.g., see the filtration system 110 as shown in FIG. 1) having a plurality of filters. In some examples, the filtration system is configured such that an airflow enters the air passage through the intake, passes through each one of the plurality of filters subsequent to entering the intake, and exits the air passage through the outlet subsequent to passing through the plurality of filters. According to some examples, the plurality of filters includes a chemical adsorption filter (e.g., see the chemical adsorption filter 404 as shown in FIGS. 4A and 4B).

Also described in the present disclosure is an apparatus including an air purifier having a housing. In some examples, the air purifier includes an intake and an outlet, wherein the intake and the outlet are connected by an air passage. According to some examples, the air purifier includes a filtration system. The filtration system may include a pre-filter (e.g., see the pre-filter 402 as shown in FIGS. 4A and 4B) adjacent and subsequent to the intake. In some examples, the filtration system includes a chemical adsorption filter adjacent and subsequent to the pre-filter. According to some examples, the filtration system includes an after filter (e.g., see the after filter 406 as shown in FIGS. 4A and 4B) adjacent and subsequent to the chemical adsorption filter. The outlet may be subsequent to the after filter. In some examples, the air purifier includes a motor (e.g., see motor 412 as shown in FIGS. 4A and 4B) configured to draw an airflow through the filtration system. According to some examples, the filtration system is configured such that the airflow enters the air passage through the intake, the pre-filter, the chemical adsorption filter, the after filter, and then exits through the outlet.

The foregoing, and other features and advantages of the invention, will be apparent from the following, more particular description of the preferred embodiments of the invention, the accompanying drawings, and the claims.

BRIEF DESCRIPTION OF THE DRAWINGS

These and other features, aspects, and advantages are described below with reference to the drawings, which are intended to illustrate, but not to limit, the invention. In the drawings, like characters denote corresponding features consistently throughout similar embodiments.

COMPONENT INDEX

100—Apparatus
102—Housing
104—Top wall
106—Side wall
108—Bottom wall
110—Filtration system
202—Wheel
204—Intake
206—Outlet
208—Pressure gauge
210—Controller
212—Central axis
214—Air passage
216—Camera
218—Lock
302—Fan
304—Fan plate
402—Pre-filter
404—Chemical adsorption filter
406—After filter
408—HEPA filter
410—Anti-microbial filter
412—Motor
414—Layered wall
416—Insulation layer
418—Outer wall
420—Inner wall
422—Plenum
502—Tray

DETAILED DESCRIPTION

Figure 1:
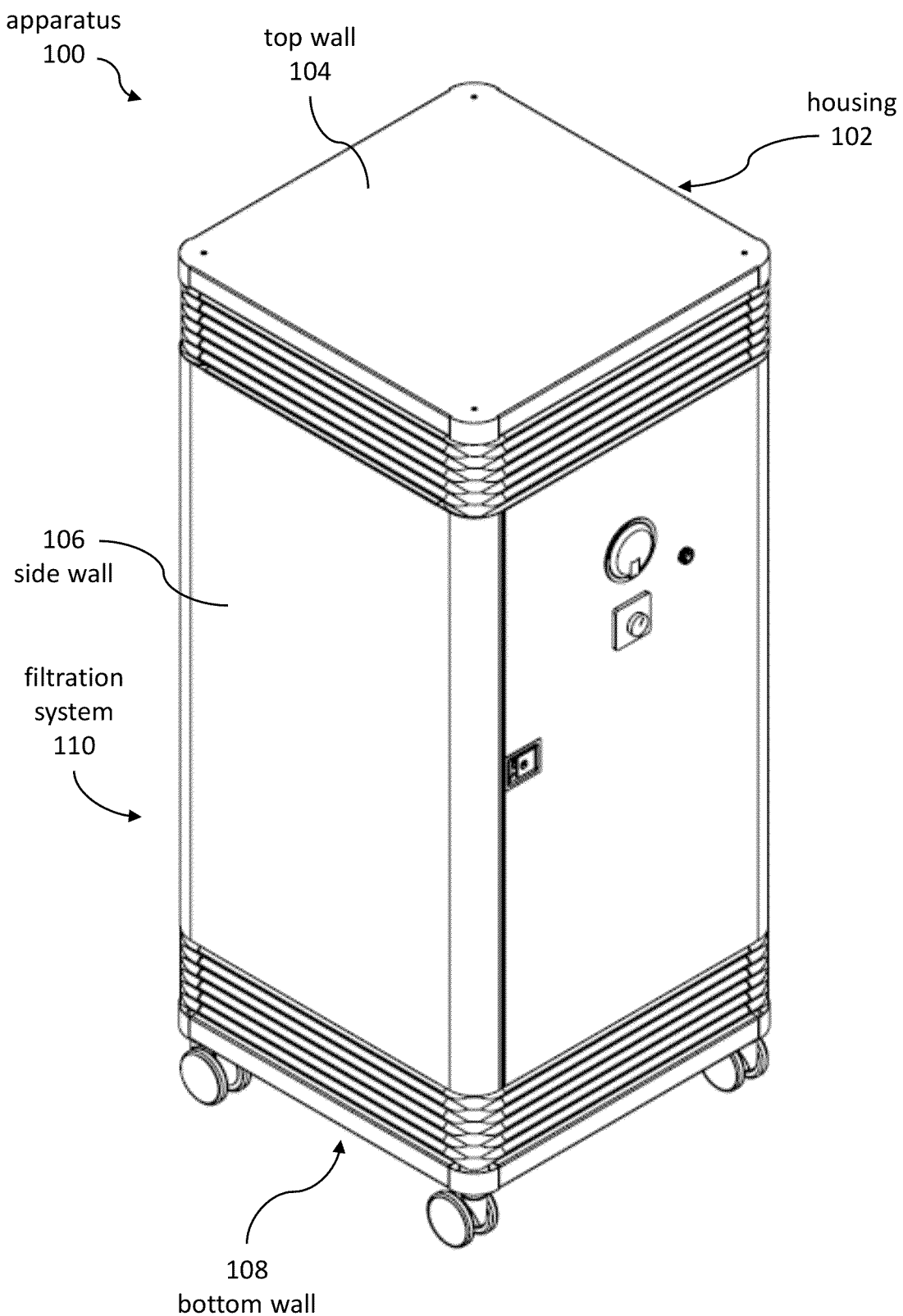
FIG. 1 illustrates a perspective view of an air purification system, according to some examples.
Figure 2:
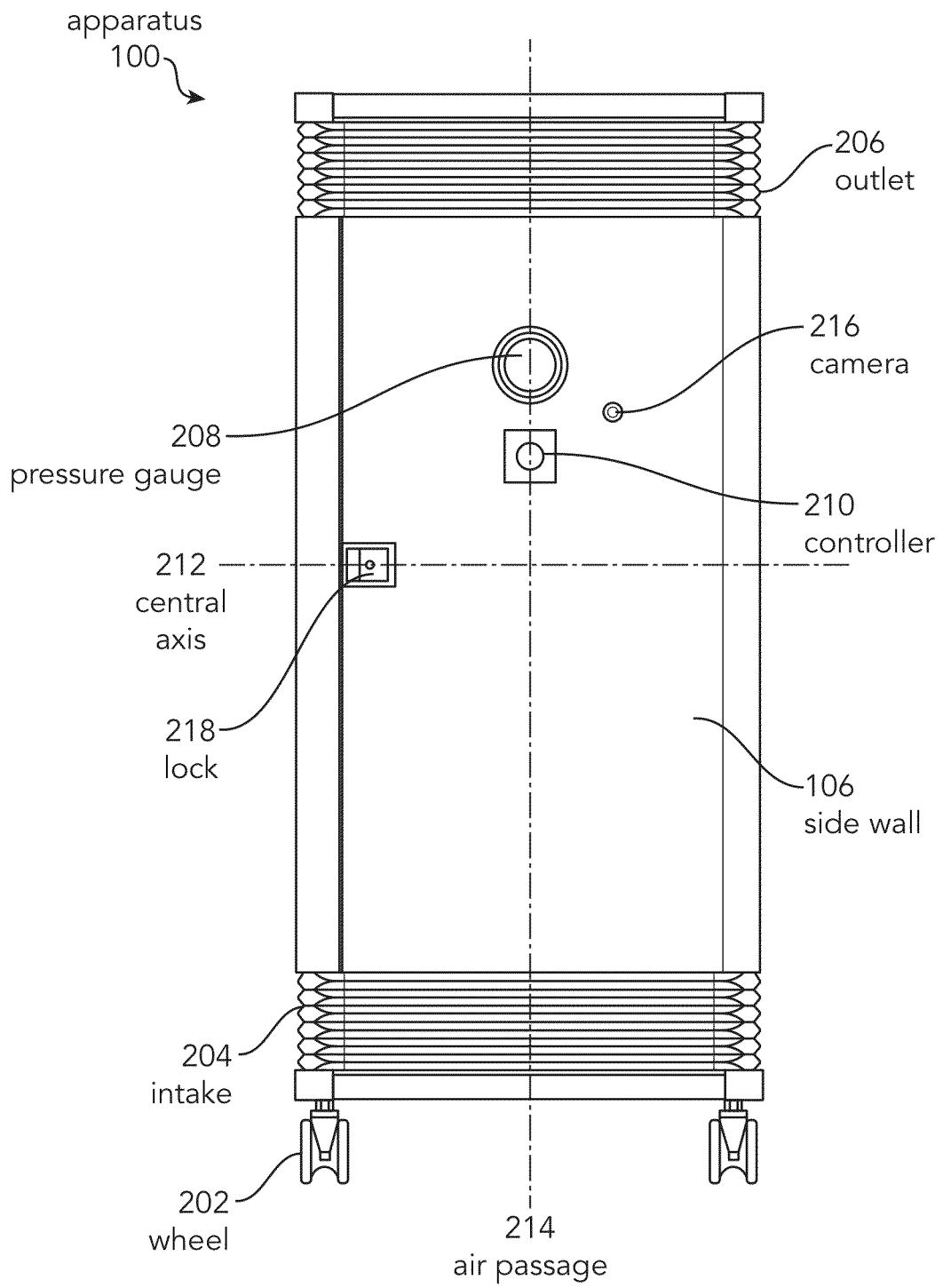
FIG. 2 illustrates one example of a side view of the air purification system of FIG. 1, according to some examples.

FIG. 1 illustrates a perspective view of one example of an apparatus 100, and FIG. 2 shows a side view of apparatus 100. As illustrated, apparatus 100 may include an air purifier having a housing 102. Housing 102 may include a top wall 104, a bottom wall 108, and at least one side wall. While housing 102 in FIGS. 1 and 2 is shown as a rectangular prism, it is understood that other shaped housing 102s are possible while still practicing the present disclosure.

According to some examples, apparatus 100 is portable, and means of transport for apparatus 100 may include at least one wheel 202. In some examples, this at least one wheel 202 is coupled to the bottom wall 108 of housing 102. In other examples, such as those that will be explored in FIG. 5, at least one wheel 202 is attached to a separate component upon which apparatus 100 may be placed. FIG. 1 shows three wheels 202, and FIG. 2 illustrates two wheels 202. Based on the location of wheels 202 in these perspectives, it is implied that the wheels 202 form a rectangular formation, matching the shape of apparatus 100. However, other formations of wheels 202, such as a triangular formation, may also be utilized, so long as apparatus 100 is capable of balancing without outside interference.

Figure 5:
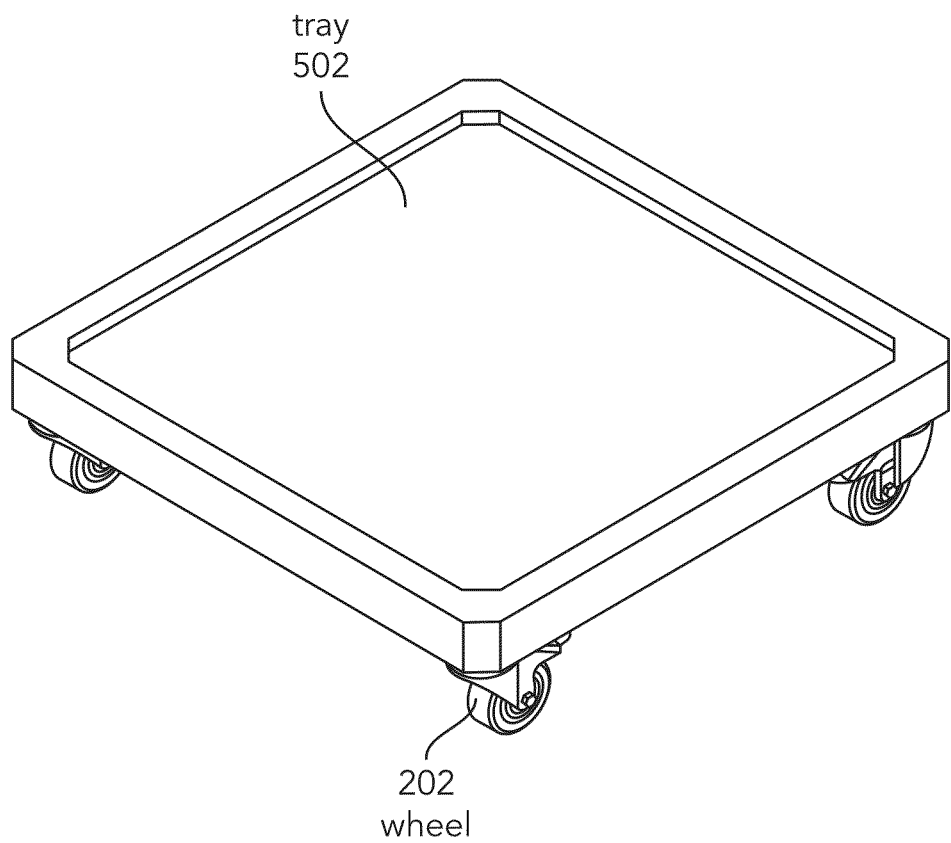
FIG. 5 illustrates a perspective view of a tray with wheels for transport and mounting of the air purification system of FIG. 1, according to some examples.

While wheels 202 are shown in FIGS. 1 and 2, apparatus 100 does not require wheels 202 to be functional, and as such, examples of the present disclosure exist where apparatus 100 does not include wheels 202. In such examples, a detachable tray (e.g., detachable tray 502 as shown in FIG. 5) which does include wheels 202 may be present, facilitating the transport of apparatus 100. While not shown, apparatus 100 may include a handle, for example, to also facilitate the carriage of apparatus 100 without the use of wheels 202.

Also shown in FIGS. 1 and 2 are an intake 204 and an outlet 206. FIG. 2 illustrates a central axis 212 running horizontally through apparatus 100. In some examples, intake 204 is located beneath this central axis 212, and outlet 206 is located above this central axis 212, as shown in FIG. 2. However, it is understood that these locations may be swapped, or the intake 204 and outlet 206 may even be on the same side of the central axis 212, so long as air is permitted to flow through the filtration system 110 after entering the intake 204 and before exiting the outlet 206. The filtration system 110 is explored more thoroughly in FIGS. 4A, 4B, and 6A-C.

As can be seen in FIG. 1, intake 204 and outlet 206 both run along all of the side walls 106 present on apparatus 100, and extend across the entire width of each side wall 106 upon which the intake 204 and outlet 206 reside. However, it is understood that intake 204 and outlet 206 do not need to be present on every side wall, nor do they need to extend the entire width of each wall upon which they reside. In some examples, the intake 204 and outlet 206 may exist on the bottom wall 108, top wall 104, or both, instead of, or in combination with, any intake 204 or outlet 206 present on the side walls 106. It is also understood, however, that the greater the surface area covered by intake 204 and outlet 206, the greater the quantity of air that may be passed through apparatus 100. According to some examples, and as shown in FIG. 2, the air flows along a vertical air passage 214 in a manner substantially parallel to the side walls 106.

Also shown in FIGS. 1 and 2, but only labeled in FIG. 2, are a pressure gauge 208 and a controller 210. According to some examples, the pressure gauge 208 provides an indication to a user of an increase or decrease in pressure drop. This change in pressure drop may indicate a need for maintenance or repair of one or more of the filters. The controller 210 may be operated by a user to manually communicate to the fan 302 or motor 412 to operate the apparatus 100 on an "as needed" basis, which may provide benefits such as energy savings in a room that is not currently occupied.

Figure 3:
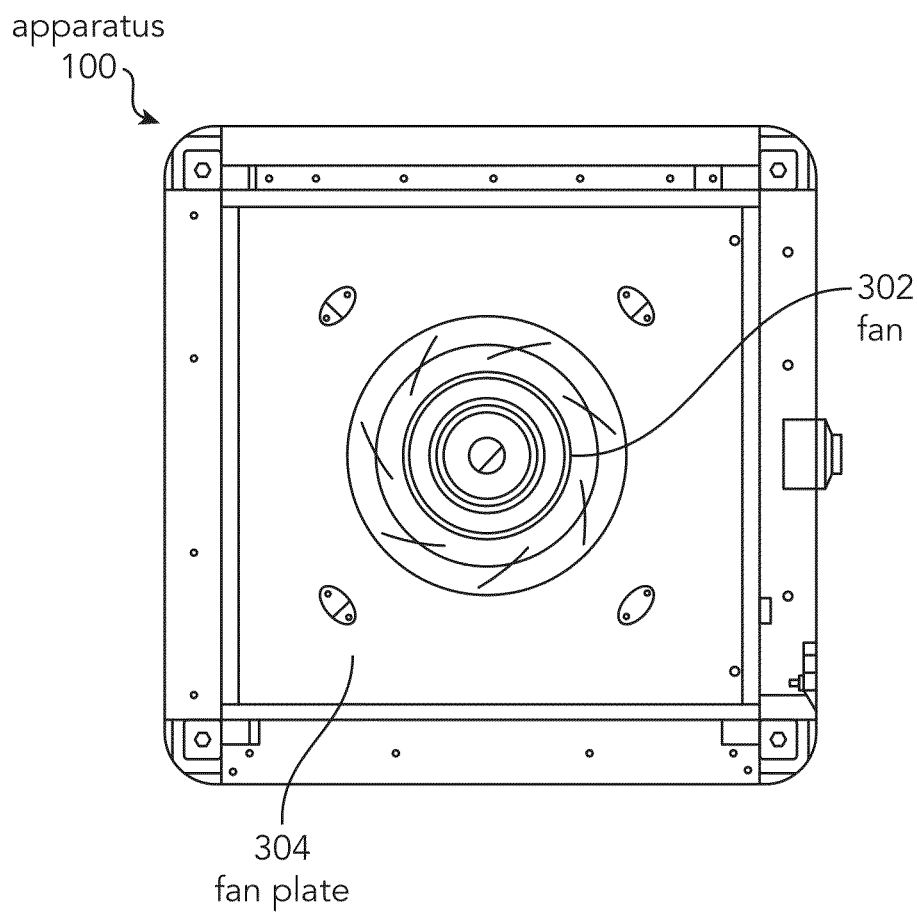
FIG. 3 illustrates a cross-sectional view of a fan section of the air purification system of FIG. 1, according to some examples.
Figure 4A:
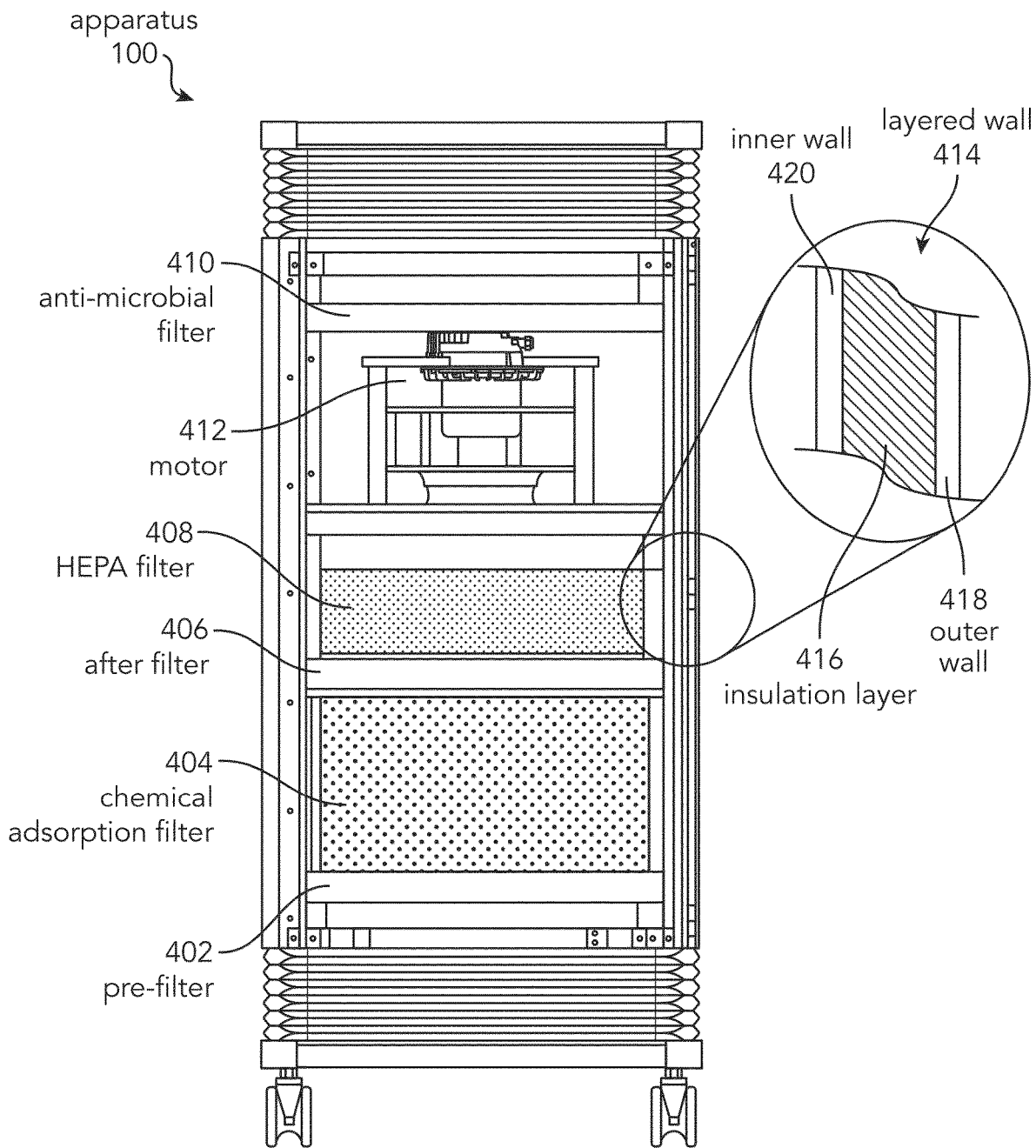
FIG. 4A illustrates one example of a cross-sectional front view of the air purification system of FIG. 1, according to some examples.
Figure 4B:
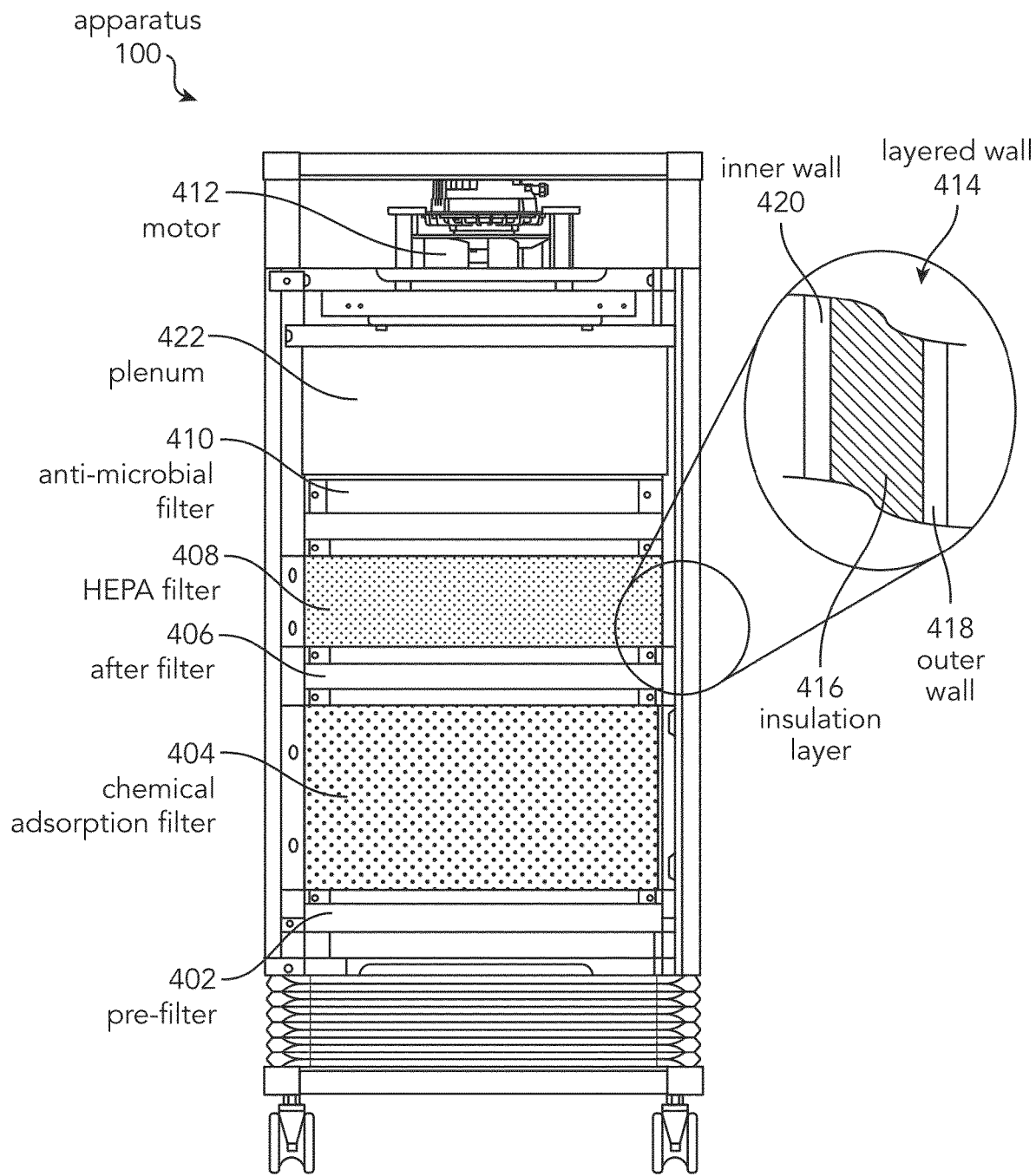
FIG. 4B illustrates an additional example of a cross-sectional front view of the air purification system of FIG. 1, according to some examples.

While not illustrated, a sensor may be present on apparatus 100. The sensor may be capable of detecting the air purity in a room. In some examples, this sensor can communicate with the fan (e.g., fan 302 as shown in FIG. 3) or motor (e.g. motor 412 as shown in FIGS. 4A and 4B) in order to influence the quantity of air being pulled through the apparatus 100. This may be affected by virtue of a higher air change per hour (ACH) or a larger number of re-circulations through the air purifier.

It is important to increase the quantity of air moving through the apparatus 100 when air purity is lower, as these are the times when the greatest amount of unwanted particulates or contaminants are present in the air. The faster the air flows through apparatus 100, the faster these undesirable pollutants are removed, thus increasing the purity of the air.

Some example specifications for expediting the removal of unwanted particulates or contaminants include a nominal air flow of about 1150 cubic feet per minute, with five and a half air changes per hour. In some examples, apparatus 100 can purify the air in a 1200 square foot (or 12000 cubic foot) room. According to some examples, apparatus 100 takes a voltage of about 115 volts with a 5-15P cord and plug. The apparatus 100 may use an IE4 ECM motor 412. According to some examples, the dimensions of apparatus 100 are approximately 29 inches by 29 inches by 68 inches, wherein the 68-inch dimension is the height of apparatus 100. The apparatus 100 may be made from coated steel with ABS plastic louvers.

In some examples, the noise level of apparatus 100 is about 70 decibels at a distance of three feet. This value may vary with the change in the rotations per minute (RPM) of the fan and/or the motor, as well as the increase and decrease in air flow. In some examples, the air purifier, top wall 104, bottom wall 108, and/or the inside of the plenum 422 are lined with a suitable acoustic foam material in order to decrease the sound level.

Additionally, as illustrated in FIG. 2, a camera 216 may be present as an additional security feature. According to some examples, the camera is capable of taking a photograph, recording a video, or both.

The pressure gauge 208 and the controller 210 are both shown on one of the side walls 106 of housing 102. However, this location is not strictly necessary, and these components may reside on the top wall 104, bottom wall 108, or both if such a construction is desired. Likewise, the sensor and the camera 216 as previously described may also reside on the top wall 104, bottom wall 108, any of the side walls 106, or any combination thereof.

While the sensor, the camera 216, the pressure gauge 208, and the controller 210 may improve the quality of life for a user of the apparatus 100, none of these components are inherent to the apparatus 100, and as such, examples exist where none—or only a few—of these components are present.

While not shown in FIG. 1 or 2, a screen may be coupled to the top wall 104, the bottom wall 108, or any of the side walls 106. In some examples, the screen is capable of providing information to a user. According to some examples, the screen communicates a status of at least one of the filters, a replacement notification of at least one of the filters, and/or a status of the air purity of a room as provided by the sensor. In some examples, the screen includes a manual interface, including the ability to start or stop the operation of the apparatus 100. Additionally or alternatively, the screen may have a Wi-Fi interface, enabling a user to start or stop the operation of the apparatus 100 from a remote computing device.

Also illustrated in FIGS. 1 and 2, but not labeled, is a door with a handle on one of the side walls 106. This door with a handle may be present on apparatus 100 in order to permit a user to see within apparatus 100, for example, to replace a filter.

FIG. 3 illustrates a cross-sectional view of a fan 302 section of apparatus 100 of FIGS. 1 and 2, according to some examples. This perspective provides a view of the fan 302 location, as well as the location of the fan plate 304, as they may appear in relation to the side walls 106. In some examples, fan 302 is configured to draw air through apparatus 100. As discussed in FIGS. 1 and 2 above, the fan 302 may be communicatively coupled to the controller 210 for modulation of the fan's speed. Once again, this controller 210 may receive communication from the sensor about the air purity of the room, or direct input from a user for this speed modulation. In some examples, fan 302 is an axial fan. In alternative examples, fan 302 is a centrifugal-type fan. The fan 302 impeller may be either forward-curved or backward-curved.

FIGS. 4A and 4B illustrate front cross-sectional views of two examples of apparatus 100 of FIGS. 1, 2, and 3. From this view, the fan 302 location can be seen above the central axis 212, along with motor 412 which operates the fan 302. As discussed in the previous figures above, this fan 302 and motor 412 may receive communication, either from controller 210 or the console, to regulate the speed at which fan 302 rotates, thus also regulating the amount of air being drawn through apparatus 100. The fan 302 impeller may either couple directly to the motor 412, or some other suitable mechanism.

Also shown in FIGS. 4A and 4B are five possible layers of filtration, including a pre-filter 402, a chemical adsorption filter 404, an after filter 406, a high-efficiency particulate air (HEPA) filter 408, and an anti-microbial filter 410. While these five filters are disclosed and illustrated, it is understood that any of these filters, alone or in combination with each other, or any additional filters, may be used. Generally, larger particulate-sized filters are present prior to smaller particulate-sized filters, but this is not strictly necessary. Any number of filters may be present in apparatus 100 as can fit in housing 102, so long as the filters do not interfere with motor 412 and the fan 302. Additionally, while the term chemical adsorption is used throughout this disclosure, it should be understood that chemical adsorption is synonymous with chemisorption, and thus these terms may be used interchangeably, and the use of one discloses the use of the other.

As seen in FIG. 4A, one potential location for motor 412 and fan 302 is between the HEPA filter 408 and the anti-microbial filter 410. However, this location is not strictly necessary for use of the apparatus 100, and motor 412 and fan 302 may be placed in any other location within housing 102.

In fact, FIG. 4B illustrates the motor 412 and the fan 302 located between the anti-microbial filter 410 and outlet 206. A benefit of this configuration for motor 412 is that a greater amount of space may be allotted to motor 412, providing better suction and therefore better air flow. In this configuration, a plenum 422 may also be provided. In some examples, this plenum 422 may allow even further space to permit even greater suction by the motor 412 and fan 302 to provide even greater air flow through apparatus 100.

The chemical adsorption filter 404 may be constructed from part carbon base and part alumina base. According to some examples, the carbon base is an activated carbon base. However, the carbon base may also be an activated carbon base impregnated by potassium hydroxide and/or sodium hydroxide. In still other examples, the carbon base is additionally impregnated with free silver and/or copper ions.

In some examples, the alumina base is an alumina-activated base. However, the alumina base may also be an alumina-activated base impregnated by potassium permanganate. According to some examples, an additional impregnation of free silver and/or copper ions may be added.

While a carbon base and an alumina base are disclosed, any composition that is effective as a medium for chemical adsorption may be used. Additionally, this disclosure includes providing the carbon base and the alumina base in equal quantities in the chemical adsorption filter 404. However, any percentage mixture of the carbon base and the alumina base may be used, so long as the mixture is effective for chemical adsorption.

In some examples, the pre-filter 402 is configured to remove larger particulate from the air, so as to not unnecessarily overwork the chemical adsorption filter 404. The chemical adsorption filter 404 may capture viruses or bacteria (or other microorganisms) in the air, and cause oxidation of these organisms due to a release of free oxygen or hydroxyl ions via the oxidizing catalyst and reaction with the activated carbon base and the alumina activated base. In this way, the chemical media that makes up the chemical adsorption filter 404 reacts with the outer protein walls and amino acids of the virus, damaging the virus and making it inactive. According to some examples, the after filter 406 captures dust particles that have made it through the chemical adsorption filter 404, thus increasing the life of the HEPA filter 408. In some examples, the HEPA filter 408 arrests and removes nearly all airborne pollutants, including allergens and microbes. The anti-microbial filter 410 may then arrest and deactivate any lingering germs or microbes. This anti-microbial filter 410 may also help to avoid any aggregation of algae and other microorganisms.

According to some examples, each of these filters may be accessed through the door present on one of the side walls 106. This door may include a lock 218, as shown in FIG. 2, and a key for operating the lock 218 to increase safety and prevent someone from unknowingly accessing the innards of the apparatus 100 while it is in operation. In some examples, each filter utilizes a sliding mechanism to facilitate the removal and replacement of the filters when needed.

As illustrated in the inset views of FIGS. 4A and 4B, the top wall 104, the bottom wall 108, and/or any of the side walls 106 may include a layered wall 414. The space between each layer of this layered wall 414 may be constructed from an insulation layer 416 surrounded by a plurality of walls, such as an outer wall 418 and an inner wall 420, forming a double-walled construction. Though two walls are shown in the figures and described herein, it is appreciated that more than two walls may be present in the layered wall 414. In some examples, this insulation layer 416 is a layer of pure, or near pure, vacuum. This layered wall 414 may be present in order to dampen the sound coming from apparatus 100. The layered wall 414 may also be present in order to dampen the vibration coming from apparatus 100. In some examples, the layered wall 414 is present in order to increase the rigidity of housing 102. In addition, either one of the outer wall 418 and the inner wall 420 may be lined with acoustic material along the air flow path in order to reduce noise.

FIG. 5 illustrates a perspective view of a tray 502 with wheels 202 for transport of apparatus 100 of FIG. 1, according to some examples. In examples of apparatus 100 that do not include wheels 202 coupled directly to the bottom wall 108 of housing 102, additional implements may be present to facilitate the transport and ease of movement of apparatus 100. As shown in FIG. 5, one such implement may be a tray 502 with at least one wheel. According to some examples, tray 502 is sized such that housing 102 may fit snuggly within tray 502. Similar to FIG. 1, FIG. 5 shows three wheels 202, one on each vertex of tray 502, by virtue of the angle at which this figure is shown. This tends to indicate a rectangular formation of wheels 202 on tray 502. However, similar to FIGS. 1 and 2, other formations, such as a triangular formation, may be utilized, so long as apparatus 100 is capable of balancing on tray 502 without outside interference.

Figure 6A:
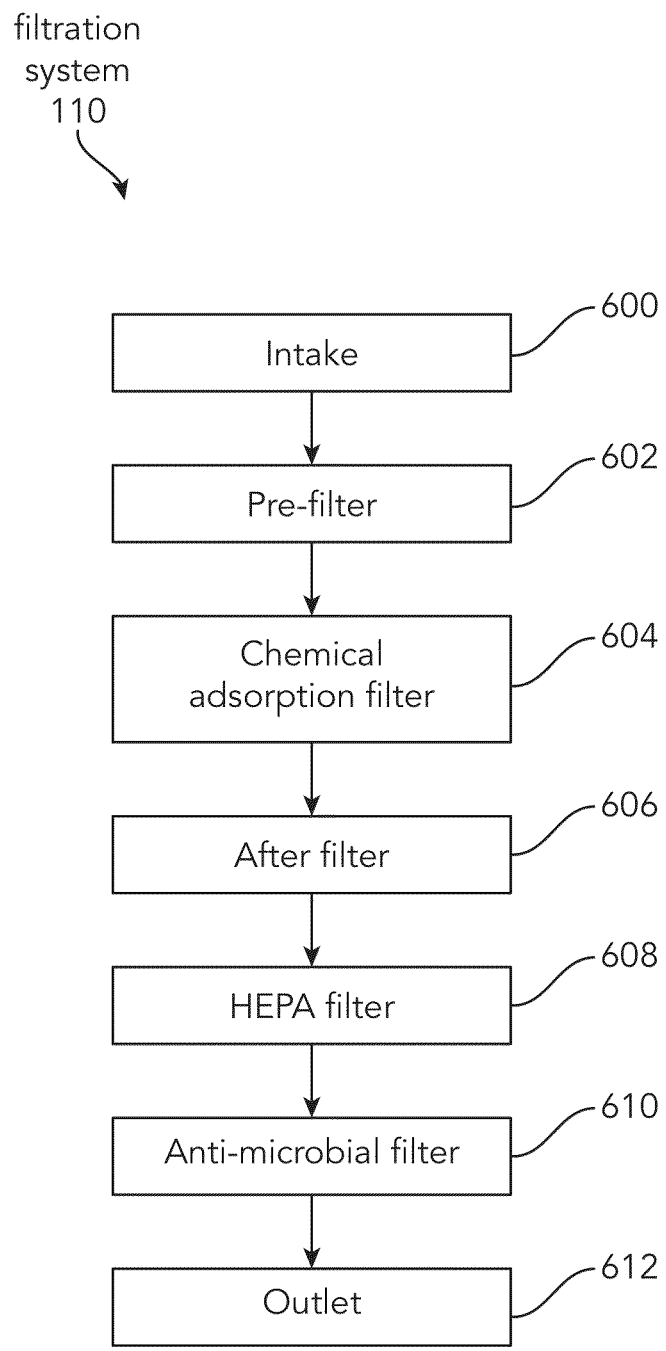
FIG. 6A illustrates a flowchart depicting a method of filtering air, according to some examples.
Figure 6B:
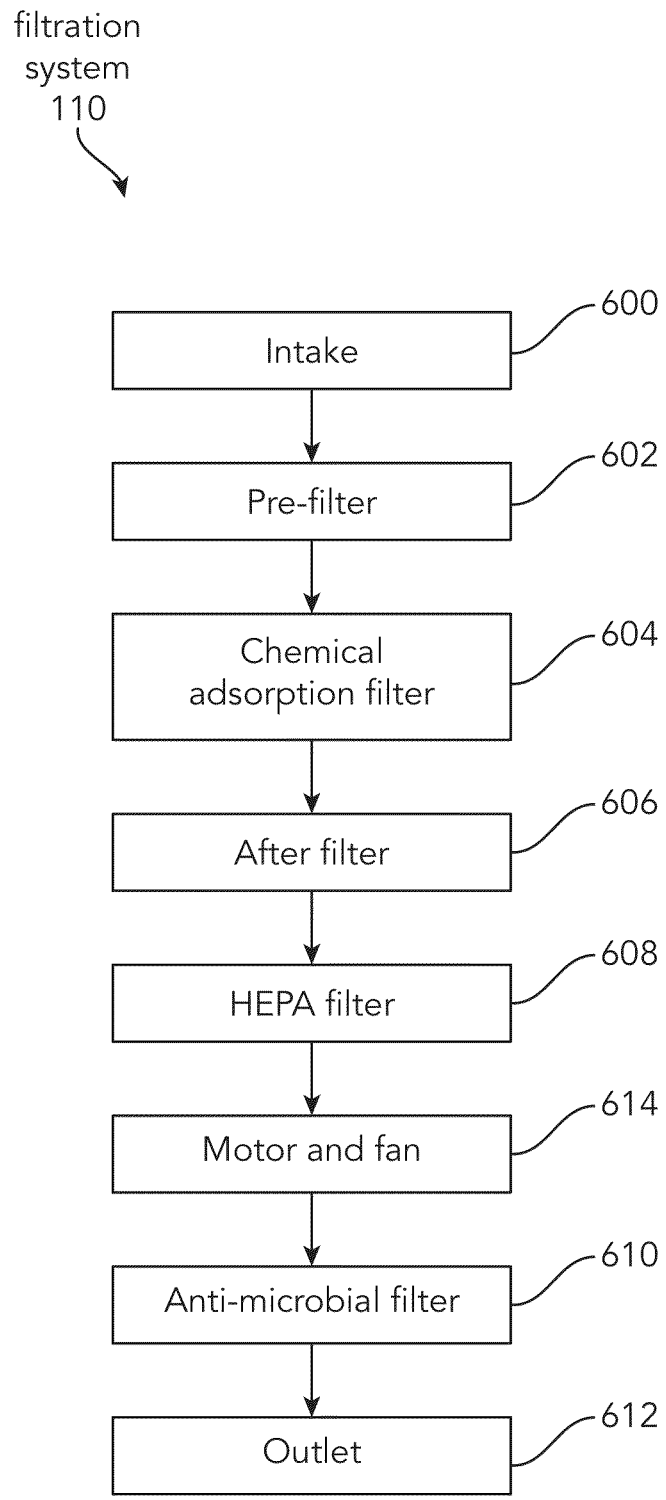
FIG. 6B illustrates the flowchart of FIG. 6A showing one possible location of a motor, according to some examples.
Figure 6C:
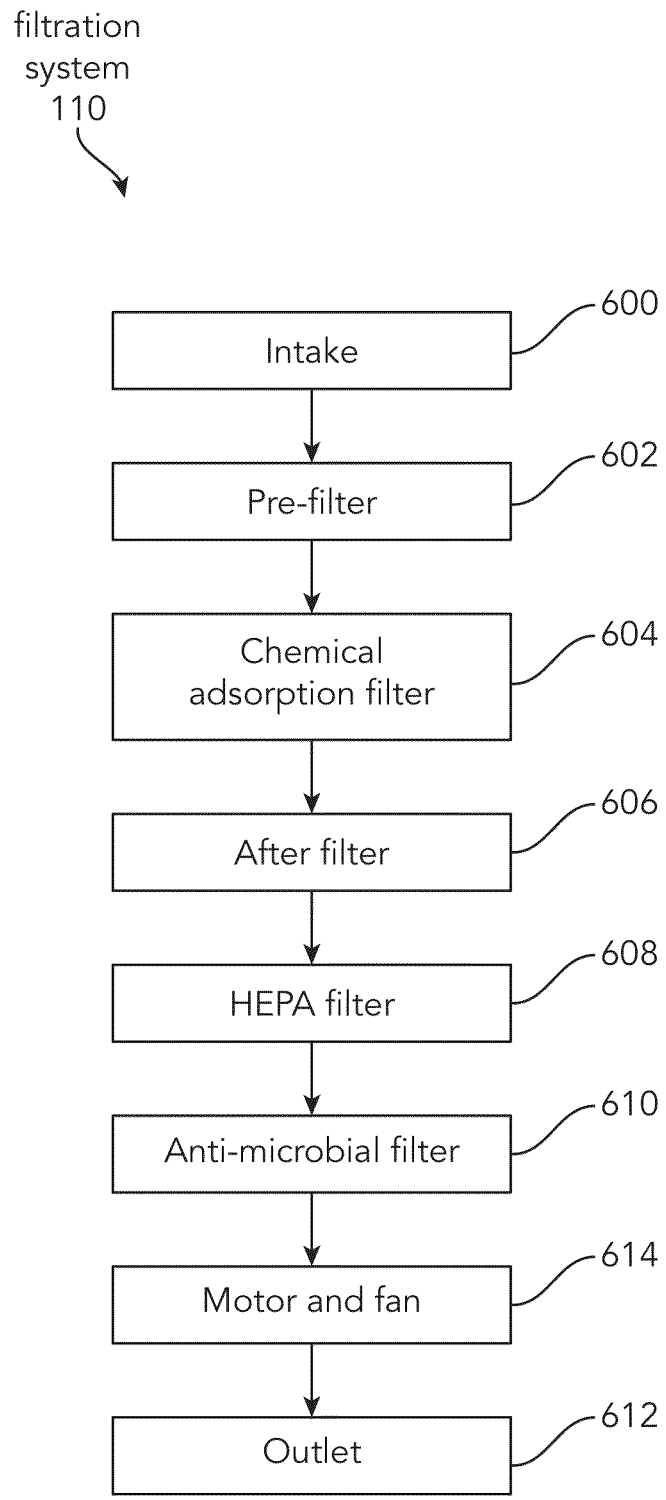
FIG. 6C illustrates the flowchart of FIG. 6A showing an additional possible location of a motor, according to some examples.

FIGS. 6A, 6B, and 6C illustrate flowcharts showing a possible order of air filtration through the filtration system 110, according to some examples. The disclosed air path may either travel from top to bottom or bottom to top throughout apparatus 100. In some examples, the air enters apparatus 100 through intake 204 (at step 600). According to some examples, the air is next filtered by the pre-filter 402 (at step 602). The air may next be filtered by the chemical adsorption filter 404 (at step 604). In some examples, the air is next filtered by the after filter 406 (at step 606). According to some examples, the air is then filtered by the HEPA filter 408 (at step 608). The air may then be filtered by the anti-microbial filter 410 (at step 610). In some examples, the air then leaves the air purification system through outlet 206 (at step 612). This specific sequence of filters is shown in FIG. 6A. However, FIGS. 6B and 6C illustrate an additional step involving motor 412.

As can be seen in FIG. 6B, the motor 412, responsible for running the fan 302 and driving the air flow through the apparatus 100, may be present between the HEPA filter 408 and the anti-microbial filter 410. In this case, after the air has passed through the HEPA filter 408 (at step 608), the air may then traverse the fan 302 and motor 412 (at step 614) prior to passing through the anti-microbial filter 410 (at step 610).

Additionally, as can be seen in FIG. 6C, the motor 412 and fan 302 may also be present between the anti-microbial filter 410 and outlet 206. In this example, after the air has passed through the anti-microbial filter 410 (at step 610), the air may then traverse the fan 302 and motor 412 (at step 614) prior to exiting out of outlet 206 (at step 612).

As discussed in FIGS. 4A and 4B, the five filters present are not purely indicative of the filters that may be included in apparatus 100. Any number of filters may be used in the system, up to and including as many filters as can fit within housing 102 so long as they do not interfere with the motor 412 or the fan. As illustrated in each of FIGS. 6A, 6B, and 6C, generally, the air will be directed through larger particulate-sized filters prior to smaller particulate-sized filters, but, again, this is not strictly necessary for the device to operate properly.

Figure 7:
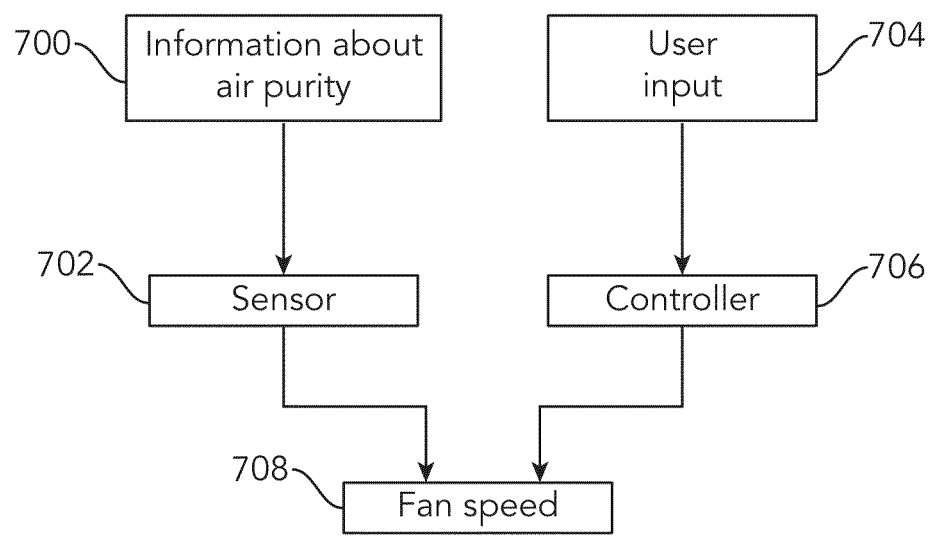
FIG. 7 illustrates a flowchart depicting a method of communicating with a fan of the air purification system of FIG. 1, according to some examples.

FIG. 7 illustrates a flowchart depicting a method of communicating with a fan 302 of apparatus 100, according to some examples. In some examples, information about air purity is obtained (at step 700). This information about air purity may be obtained by a sensor (at step 702). According to some examples, the sensor communicates with the fan, based on the information about air purity, to modulate the fan's 302 speed (at step 708).

Additionally or alternatively, user input may be received (at step 704). In some examples, this user input is received by controller 210 (at step 706). According to some examples, controller 210 then communicates with the fan, based on the user input, to modulate the fan's 302 speed (at step 708).

In general, the present disclosure describes an apparatus 100 including an air purifier having a housing 102. In some examples, the air purifier includes an intake 204 and an outlet 206. According to some examples, intake 204 and outlet 206 are connected by air passage 214. The air purifier may include a filtration system 110 having a plurality of filters. In some examples, the filtration system 110 is configured such that an airflow enters the air passage 214 through intake 204, passes through each one of the plurality of filters subsequent to entering intake 204, and exits the air passage 214 through outlet 206 subsequent to passing through the plurality of filters. According to some examples, the plurality of filters includes a chemical adsorption filter 404.

The plurality of filters may further include a pre-filter 402, an after filter 406, a high-efficiency particulate air (HEPA) filter 408, and an anti-microbial filter 410. In some examples, intake 204 is adjacent to and preceding the pre-filter 402. According to some examples, the pre-filter 402 is adjacent to and preceding the chemical adsorption filter 404. The chemical adsorption filter 404 may be adjacent to and preceding the after filter 406. In some examples, the after filter 406 is adjacent to and preceding the HEPA filter 408. According to some examples, the HEPA filter 408 is adjacent to and preceding the anti-microbial filter 410. The anti-microbial filter 410 may be adjacent to and preceding outlet 206. In some examples, apparatus 100 further includes a motor 412 placed between the HEPA filter 408 and the anti-microbial filter 410. According to some examples, apparatus 100 further includes a motor 412 placed between the anti-microbial filter 410 and outlet 206.

Housing 102 may include a layered wall 414 having a plurality of walls. In some examples, apparatus 100 further includes an insulation layer 416 between two walls of the plurality of walls. According to some examples, apparatus 100 further includes a vacuum between two walls of the plurality of walls. Housing 102 may further include two side walls 106. In some examples, intake 204 and outlet 206 are each configured to extend across the two side walls 106 separately.

According to some examples, the chemical adsorption filter 404 includes a carbon base and an alumina base. The apparatus 100 may further include a sensor configured to detect an air purity. In some examples, apparatus 100 further includes a fan 302 configured to draw air through air passage 214. According to some examples, apparatus 100 further includes a controller 210 configured to modulate a speed of fan 302. Controller 210 may receive information from user input. In some examples, controller 210 receives information from the sensor.

In some examples, apparatus 100 further includes a screen. According to some examples, the screen is configured to display information. The apparatus 100 may further include a camera 216. In some examples, apparatus 100 further includes a tray 502 having a wheel 202. According to some examples, tray 502 detachably couples to housing 102.

Also described in the present disclosure is an apparatus 100 including an air purifier having a housing 102. In some examples, the air purifier includes an intake 204 and an outlet 206, wherein the intake 204 and the outlet 206 are connected by an air passage 214. According to some examples, the air purifier includes a filtration system 110.

The filtration system 110 may include a pre-filter 402 adjacent and subsequent to the intake 204. In some examples, the filtration system 110 includes a chemical adsorption filter 404 adjacent and subsequent to the pre-filter 402. According to some examples, the filtration system 110 includes an after filter 406 adjacent and subsequent to the chemical adsorption filter 404. The outlet 206 may be subsequent to the after filter 406. In some examples, the air purifier includes a motor 412 configured to draw an airflow through the filtration system 110. According to some examples, the filtration system 110 is configured such that the airflow enters the air passage 214 through the intake 204, the pre-filter 402, the chemical adsorption filter 404, the after filter 406, and then exits through the outlet 206.

The filtration system 110 may further include a high-efficiency particulate air (HEPA) filter 408 and an anti-microbial filter 410. In some examples, the filtration system 110 is configured such that the airflow enters the air passage 214 through the intake 204, the pre-filter 402, the chemical adsorption filter 404, the after filter 406, the HEPA filter 408, the anti-microbial filter 410, and then exits through the outlet 206. According to some examples, either motor 412 is located between the anti-microbial filter 410 and outlet 206, or motor 412 is located between the HEPA filter 408 and the anti-microbial filter 410.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

I claim:

1. An apparatus, comprising:
   an air purifier comprising a housing;
   a tray detachably coupled to a bottom wall of the housing, the tray including a wheel;
   an intake and an outlet, wherein the intake and the outlet are connected by an air passage;
   a filtration system comprising:
      a pre-filter adjacent and subsequent to the intake;
      a chemical adsorption filter adjacent and subsequent to the pre-filter, the chemical adsorption filter including:
         an alumina-activated base impregnated by an alumina impregnation component selected from the group consisting of potassium permanganate, free silver ions, free copper ions, and combinations thereof; and
         an activated carbon base impregnated by a carbon impregnation component selected from the group consisting of free silver ions, free copper ions, and a combination thereof;
      an after-filter adjacent and subsequent to the chemical adsorption filter;
      a high-efficiency particulate air (HEPA) filter adjacent and subsequent to the after-filter; and
      an anti-microbial filter adjacent and subsequent to the HEPA filter,
      wherein the outlet is subsequent to the anti-microbial filter, and
      wherein the filtration system is configured such that airflow enters the air passage through the intake, the pre-filter, the chemical adsorption filter, the after-filter, the HEPA filter, the anti-microbial filter, and then exits through the outlet; and
   a motor configured to draw the airflow through the filtration system.

2. An apparatus, comprising:
   an air purifier comprising a housing;
   four wheels fixedly coupled to a bottom wall of the housing, wherein the four wheels define a rectangular formation whereby each wheel of the four wheels is located at a different corner of the bottom wall of the housing;

an intake and an outlet, wherein the intake and the outlet are connected by an air passage;

a filtration system comprising:
  a pre-filter adjacent and subsequent to the intake;
  a chemical adsorption filter adjacent and subsequent to the pre-filter, the chemical adsorption filter including:
    an alumina-activated base impregnated by an alumina impregnation component selected from the group consisting of potassium permanganate, free silver ions, free copper ions, and combinations thereof; and
    an activated carbon base impregnated by a carbon impregnation component selected from the group consisting of free silver ions, free copper ions, and a combination thereof;
  an after-filter adjacent and subsequent to the chemical adsorption filter;
  a high-efficiency particulate air (HEPA) filter adjacent and subsequent to the after-filter; and
  an anti-microbial filter adjacent and subsequent to the HEPA filter,
  wherein the outlet is subsequent to the anti-microbial filter, and
  wherein the filtration system is configured such that airflow enters the air passage through the intake, the pre-filter, the chemical adsorption filter, the after-filter, the HEPA filter, the anti-microbial filter, and then exits through the outlet; and a motor configured to draw the airflow through the filtration system.

3. The apparatus of claim 1, further comprising a sensor configured to detect an air purity.

4. The apparatus of claim 3, further comprising:
a fan configured to draw air through the air passage; and
a controller configured to modulate a speed of the fan.

5. The apparatus of claim 4, wherein the controller receives information from a user input.

6. The apparatus of claim 4, wherein the controller receives information from the sensor.

7. The apparatus of claim 1, wherein the apparatus further comprises a screen, and wherein the screen is configured to display information.

8. The apparatus of claim 1, wherein the apparatus further comprises a camera.

9. The apparatus of claim 2, wherein the motor is located between the anti-microbial filter and the outlet.

10. The apparatus of claim 2, wherein the motor is located between the HEPA filter and the anti-microbial filter.

11. The apparatus of claim 2, wherein the housing comprises a layered wall comprising a plurality of walls.

12. The apparatus of claim 11, further comprising an insulation layer between two walls of the plurality of walls.

13. The apparatus of claim 11, further comprising a vacuum between two walls of the plurality of walls.

14. The apparatus of claim 13, wherein the housing further comprises two side walls, and
  wherein the intake and the outlet are each configured to extend across the two side walls separately.

15. The apparatus of claim 2, further comprising a sensor configured to detect an air purity.

16. The apparatus of claim 15, further comprising:
a fan configured to draw air through the air passage; and
a controller configured to modulate a speed of the fan.

17. The apparatus of claim 16, wherein the controller receives information from a user input.

18. The apparatus of claim 16, wherein the controller receives information from the sensor.

19. The apparatus of claim 2, wherein the apparatus further comprises a screen, and wherein the screen is configured to display information.

20. The apparatus of claim 2, wherein the apparatus further comprises a camera.

* * * * *